United States Patent [19]

Schaefer

[11] 4,245,332
[45] Jan. 13, 1981

[54] RECEIVER CIRCUIT FOR AN ECHO-SOUNDING SYSTEM

[75] Inventor: Horst Schaefer, Kiel, Fed. Rep. of Germany

[73] Assignee: Honeywell Inc., Minneapolis, Minn.

[21] Appl. No.: 29,179

[22] Filed: Apr. 12, 1979

[51] Int. Cl.³ .............................................. G01S 15/02
[52] U.S. Cl. ..................................................... 367/98
[58] Field of Search .................................... 367/97, 98

[56] References Cited

U.S. PATENT DOCUMENTS 3,454,922  7/1969  Dory ..................................... 367/97

FOREIGN PATENT DOCUMENTS 1358812  7/1974  United Kingdom ...................... 367/97

*Primary Examiner*—Richard A. Farley
*Attorney, Agent, or Firm*—Charles L. Rubow

[57] ABSTRACT

An echo-sounding receiver circuit comprising first and second receiver channels and an AND gate enabled by simultaneous outputs from both receiver channels is disclosed. The first receiver channel includes an echo stacking circuit, an echo selection circuit, and a tracking window circuit for establishing a measuring range or window whose timing is determined in part by detection of the first primary target echo in a sounding period and whose duration is established by the tracking window circuit. The second receiver channel includes a tracking threshold circuit and a second echo selection circuit for detecting the first echo that exceeds an amplitude determined by the amplitude of the preceding primary target echo. Upon detection of a primary echo by the second channel during the window established by the first channel, the AND gate supplies an output signal to a recording instrument or other utilization device.

4 Claims, 1 Drawing Figure

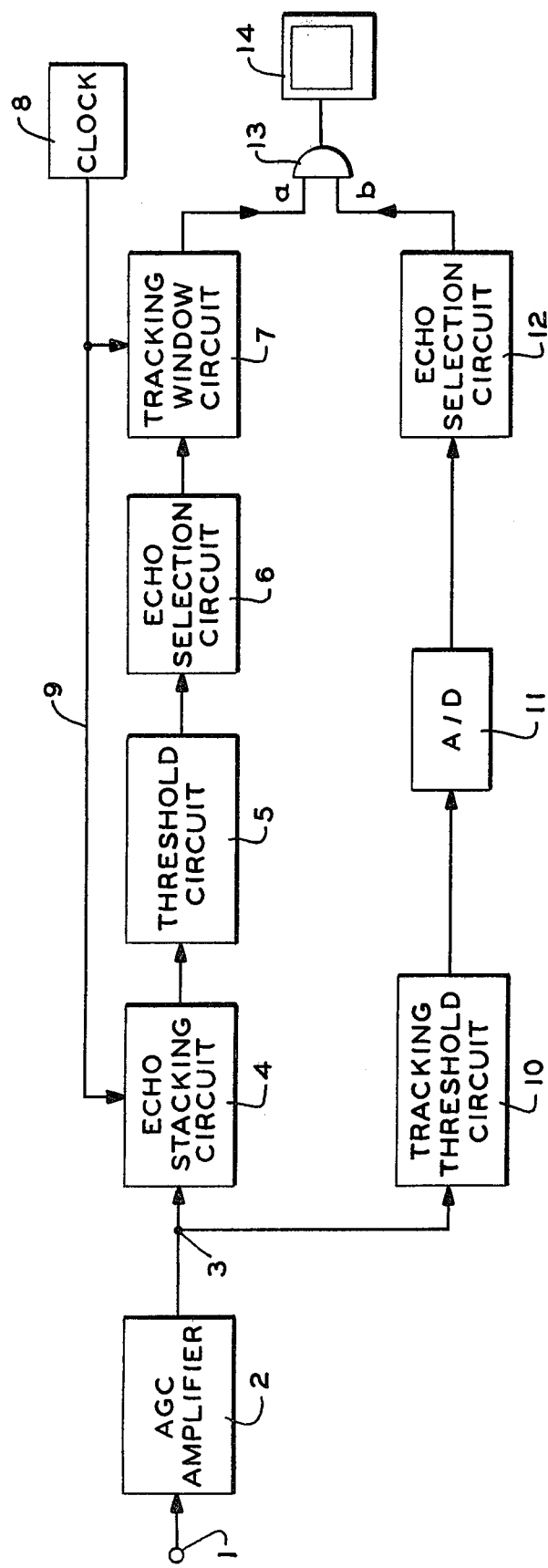

RECEIVER CIRCUIT FOR AN ECHO-SOUNDING SYSTEM

BACKGROUND OF THE INVENTION

The invention relates to receiver circuitry for handling incoming echo signals of an echo-sounding system and, in particular, deals with the suppression of interfering signals.

Various methods and circuits for suppressing noise and interference signals in echo-sounding systems, and for blanking out false echos, for instance, the so-called secondary echo, are known. For purposes of the following description, in the context of depth metering, the primary echo is that received directly from the bottom of the sea. The secondary echo is generated by reflection of the primary echo from the water surface and then from the seabed.

German Pat. No. 2,535,029 shows an echo-sounding system in which useful signals occurring at successive intervals of approximately the duration of one sounding period are summed up, and the summation is used for display or indication. Noise signals appearing at random are not summed up and can be suppressed by an appropriate threshold circuit. This type of noise suppression is sometimes called "echo stacking".

An "echo selection" circuit known from German Pat. No. 2,204,352 allows only the first received echo to pass, but inhibits all following signals, including the secondary echo. This circuit comprises a flip-flop which is switched by the first echo signal and remains in the switched position for the rest of the sounding period, thereby inhibiting the receiver circuit from receiving signals following the first echo.

British Pat. No. 1,500,068 shows a blanking circuit wherein echo signals from only a preselected depth range are allowed to pass, and wherein the beginning of said depth range is made dependent on the last measured depth. This blanking circuit forms what is sometimes called a "tracking window".

Finally, British Pat. No. 1,356,019 shows a circuit which establishes a "tracking threshold." The incoming echo signal is compared with a threshold reference signal, and an output signal is generated only if the incoming signal exceeds the threshold. The threshold reference signal is derived from the last received echo for which a corresponding voltage is stored by means of a capacitor. In order to allow the tracking threshold to follow echo signals of decreasing amplitude, the charge on the capacitor is reduced a predetermined amount between succeeding sounding periods.

Although each of these circuits has certain advantages, some problems remain unsolved. The echo stacking circuit distinguishes well between the target echo and interference signals, but may allow secondary echos to pass. Further, a phase error is generated by the delay of the echo stacking operation and causes a depth or distance measuring error. The echo selection circuit suppresses only signals received after receipt of the first significant signal during a sounding period, the first significant signal generally being the primary target echo signal. The tracking window circuit excludes only those signals which lie outside a predetermined portion of the measuring range. The tracking threshold circuit suppresses only those signals which are lower in amplitude than the expected target echo signal.

The present invention combines certain features of the above-mentioned circuits into a receiver circuit leading to error-free selection of the primary target echo without causing a phase error in a recorded representation of the echo.

SUMMARY OF THE INVENTION

The Applicant's receiver circuit basically comprises first and second parallel signal handling channels which are connected to receive and process echo signals, and to supply corresponding output signals to an AND gate whose output signal is supplied to a recording or indicating instrument or other utilization device. The first input channel includes an echo stacking circuit, a first echo selection circuit, and a tracking window circuit connected in series, with the output terminal of the tracking window circuit connected to one input terminal of the AND gate. The second channel includes a series arrangement of a tracking threshold circuit and a second echo selection circuit whose output terminal is connected to a second input terminal of the AND gate. The echo signals may be supplied to the first and second channels through a control amplifier having automatic gain control circuitry.

BRIEF DESCRIPTION OF THE DRAWING

The single FIGURE of the drawing is a block diagram of an echo-sounding system receiver circuit in accordance with the Applicant's present invention.

DESCRIPTION OF THE PREFERRED EMBODIMENT

With reference to the attached drawing, numeral 1 identifies an input terminal to which is connected a receiver transducer which converts incoming acoustic (primary echo and interference) signals into electrical signals. These electrical signals are supplied through a control amplifier 2 to a junction 3 of two signal handling channels. Control amplifier 2 includes automatic gain control circuitry with a time constant extending over several sounding periods.

The first channel comprises an echo stacking circuit 4, a threshold circuit 5, which may be a Schmitt trigger, a first echo selection circuit 6, and a tracking window circuit 7. A clock generator 8 is connected via line 9 to echo stacking circuit 4 wherein the clock signal steps shift registers used for intermediate storing of the signals from amplifier 2. Simultaneously the clock signals are used in the tracking window circuit 7 to step a digital counter.

A second signal handling channel comprises a tracking threshold circuit 10, an analog-to-digital converter 11 and a second echo selection circuit 12 connected in series. The outputs of the signal handling channels are connected to input terminals a and b of an AND gate 13, the output of which is connected to a recording instrument 14.

The implementation and operation of circuits suitable for performing the echo stacking, echo selection, tracking window, and tracking threshold functions are disclosed in detail in German Pat. Nos. 2,535,029 and 2,204,352 and British Pat. Nos. 1,500,068 and 1,356,019 respectively. German Pat. No. 2,535,029 also shows a Schmitt trigger corresponding to threshold circuit 5 in combination with the disclosed echo stacking circuit.

The operation of the Applicant's receiver circuit is as follows. In echo stacking circuit 4, the incoming signals are converted into digital signals, and a pulse is formed whose voltage is a multiple, such as five, times the value of an individual echo pulse. This is achieved by summing the digitized signals over five sounding periods. The series connected threshold circuit 5, accordingly, may be adjusted to provide a threshold of four times the voltage corresponding to an individual echo pulse. Therefore, all pulses are rejected which are received less than five times at successive intervals, each interval having the duration of one sounding period. With great probability, the pulse at the output of threshold circuit 5 will correspond to an echo from the desired target. This pulse then actuates echo selection circuit 6 so that any following secondary echo signal is not allowed to pass through circuit 6 even though the secondary echo signal also has been summed up over five sounding periods. Echo selection circuit 6 determines the beginning of a measuring range section or window having a duration determined by tracking window circuit 7. For the duration of the window, circuit 7 provides a voltage to input a of AND gate 13.

As mentioned above, the pulse derived from echo stacking circuit 4 includes a small phase error. This phase error, however, is not critical in controlling the timing of the tracking window established by circuit 7 because appropriate compensation can be provided when setting the measuring range. As described in British Pat. No. 1,500,068, the beginning of the measuring range (initial window timing) is set by entering a predetermined number of counting pulses. Because of the width of the window, some tolerance is permitted on the number of counting pulses.

In the second channel, tracking threshold circuit 10 will only allow echo signals to pass whose amplitude exceeds a threshold established by the last received target echo. The signal produced at the output of tracking threshold circuit 10 is converted to digital form by means of analog-to-digital converter 11, and then is supplied to echo selection circuit 12. As soon as circuit 12 responds to a first echo during a sounding period and is rendered inactive for the remainder of the period, it supplies a voltage pulse to input b of AND gate 13. When AND gate 13 is enabled by voltages from both channels, it supplies a signal to recording instrument 14.

It is not a principal function of echo selection circuit 12 to provide for suppression of secondary echos. There is generally a relatively long time between a primary echo and a corresponding secondary echo. Therefore, secondary echos are already outside the measuring range or window. More specifically, when a secondary echo is received, tracking window circuit 7 has already ceased supplying an output voltage so that AND gate 13 is not enabled. Echo selection circuit 12, rather, is provided for suppressing signals which closely follow the target echo signal and for suppressing echos reflected from layers below the bottom of the sea which otherwise could lead to an indication that the bottom is deeper than in fact it is.

A strong signal exceeding the threshold of circuit 10 and arriving before a target echo may deactivate echo selection circuit 12 so that it does not respond to the target echo signal. In such a case, no target would be indicated by recording device 14 for that sounding period. However, an occasional failure to indicate water depth is not as severe a problem as indicating an erroneous depth as could occur if echo selection circuit 12 were omitted.

In accordance with the foregoing description, the receiver circuit of the present invention provides for highly reliable recording of actual target echos and accurate depth or distance indications free from phase errors.

A single embodiment of an echo-sounding receiver circuit in accordance with Applicant's invention has been shown and described for illustrative purposes. Other embodiments which do not depart from the teaching herein will be apparent to those skilled in the art. The Applicant does not intend that coverage be limited to the disclosed embodiment, but only by the terms of the appended claims.

The embodiments of the invention in which an exclusive property or right is claimed are defined as follows:

1. In an echo-sounding system for indicating echos from a desired target, said system including an echo stacking circuit for summing corresponding echo signals from successive sounding periods, an echo selection circuit for admitting only a first significant echo signal during each sounding period, a tracking window circuit for producing a signal corresponding to only a portion of the total distance range dependent on distance to the target, and a threshold circuit for admitting only echo signals whose amplitude exceeds a threshold derived from the most recent target echo, an improved receiver circuit comprising:

a first receiver channel connected to receive input signals which may include primary echo signals from a desired target and interfering signals, said first channel including an echo stacking circuit, a first echo selection circuit, and a tracking window circuit for producing a characteristic signal during an interval whose duration is established by said tracking window circuit and whose timing is established at least in part by detection of a primary echo signal by said echo stacking circuit and said first echo selection circuit;

a second receiver channel connected to receive said input signals, said second channel including a tracking threshold circuit and a second echo selection circuit for producing a characteristic signal when a primary echo is detected;

a utilization device having an input terminal for receiving signals representative of target echos; and an AND gate having first and second input terminals connected respectively to said first and second receiver channels and an output terminal connected to the input terminal of said utilization device, whereby a signal is supplied to said utilization device when characteristic signals are being produced by both first and second receiver channels.

2. The echo-sounding system of claim 1 wherein said input signals are supplied to said first and second receiver channels through a control amplifier with automatic gain control circuitry.

3. The echo-sounding system of claim 1 or 2 wherein:

said echo stacking circuit, said first echo selection circuit, and said tracking window circuit are connected in series, with said first echo selection circuit between said echo stacking circuit and said tracking window circuit, and the output signal of said tracking window circuit is supplied to the first input terminal of said AND gate; and said tracking threshold circuit and said second echo selection circuit are connected so that a signal derived from said tracking threshold circuit is supplied to said second echo selection circuit, and the output signal of said second echo selection circuit is supplied to the second input terminal of said AND gate.

4. An echo-sounding receiver circuit comprising:
input means for supplying echo signals representative of echos of periodic acoustic pulses received from underwater objects including a desired target;
an echo stacking circuit for summing corresponding echo signals in successive sounding periods;
a first echo selection circuit connected to receive signals from said echo stacking circuit, said first echo selection circuit being operable to pass only a first significant signal during each sounding period;
a tracking window circuit for producing a signal of predetermined duration corresponding to only a portion of a total distance range depending on distance to the target in response to each signal from said first echo selection circuit;
a tracking threshold circuit for passing only echo signals whose amplitude exceeds a threshold derived from the most recent target echo;
a second echo selection circuit connected to receive signals derived from said tracking threshold circuit, said second echo selection circuit being operable to pass only a first significant signal during each sounding period;
an AND gate having input terminals connected to said tracking window circuit and said second echo selection circuit, whereby the output signals of said AND gate represent only primary echos from the desired target; and
utilization means connected to receive the output signal of said AND gate.

* * * * *

UNITED STATES PATENT OFFICE
CERTIFICATE OF CORRECTION

PATENT NO. : 4,245,332
DATED : January 13, 1981
INVENTOR(S) : HORST SCHAEFER

It is certified that error appears in the above-identified patent and that said Letters Patent are hereby corrected as shown below:

Cover page, lefthand column, line 5, after "Assignee:"
delete "Honeywell Inc., Minneapolis, Minn.," substitute --Honeywell-Elac-Nautik GmbH, Kiel, West Germany--.

Signed and Sealed this

Third Day of November 1981

[SEAL]

*Attest:*

*Attesting Officer*

GERALD J. MOSSINGHOFF

*Commissioner of Patents and Trademarks*